United States Patent [19]

Mouille et al.

[11] 4,012,169

[45] Mar. 15, 1977

[54] ROTOR FOR ROTATING WING TYPE AIRCRAFT

[75] Inventors: René Louis Mouille, Aix en Provence; René Louis Coffy, Marseille; Michel Aimé Hancart, Marignane; Daniel Mao, Marseille, all of France

[73] Assignee: Societe Nationale Industrielle Aerospatiale, Paris, France

[22] Filed: Mar. 22, 1976

[21] Appl. No.: 669,086

Related U.S. Application Data

[63] Continuation-in-part of Ser. No. 469,045, May 10, 1974, Pat. No. 3,967,918.

[30] Foreign Application Priority Data

May 10, 1973 France .............................. 73.16887
Mar. 7, 1974 France .............................. 74.07776
Mar. 26, 1975 France .............................. 75.09504

[52] U.S. Cl. .......................... 416/134 A; 416/141; 416/241 A

[51] Int. Cl.² ......................................... B64C 27/38

[58] Field of Search .......... 416/134, 135, 141, 244, 416/241 A, 230, 226

[56] References Cited

UNITED STATES PATENTS

| 3,384,185 | 5/1968 | Fernandez | 416/244 |
| 3,484,174 | 12/1969 | McCoubrey | 416/132 |
| 3,669,566 | 6/1972 | Bourquardez et al. | 416/134 A |
| 3,762,834 | 10/1973 | Bourquardez et al. | 416/134 A |
| 3,880,551 | 4/1975 | Kisovec | 416/134 A |
| 3,942,910 | 3/1976 | Snyder et al. | 416/141 |
| 3,950,115 | 4/1976 | Euler | 416/241 A X |
| 3,967,918 | 7/1976 | Mouille et al. | 416/241 A X |

Primary Examiner—Everette A. Powell, Jr.
Attorney, Agent, or Firm—Karl W. Flocks

[57] ABSTRACT

A rotor for a rotating wing aircraft has a star-shaped hub each arm of which supports a blade. The yoke between each blade and arm is a two tine fork constituted by a continuation of the blade root.

7 Claims, 8 Drawing Figures

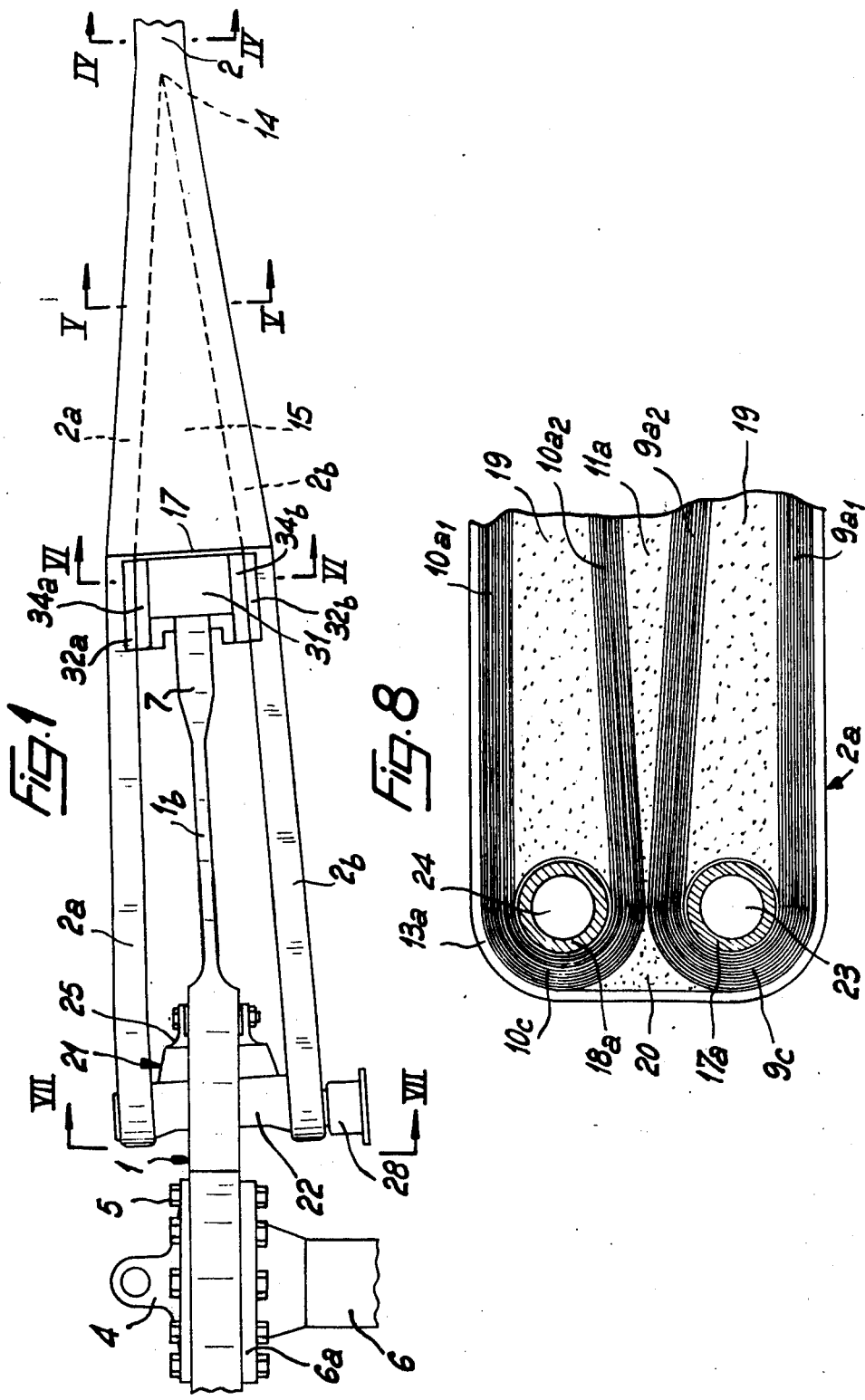

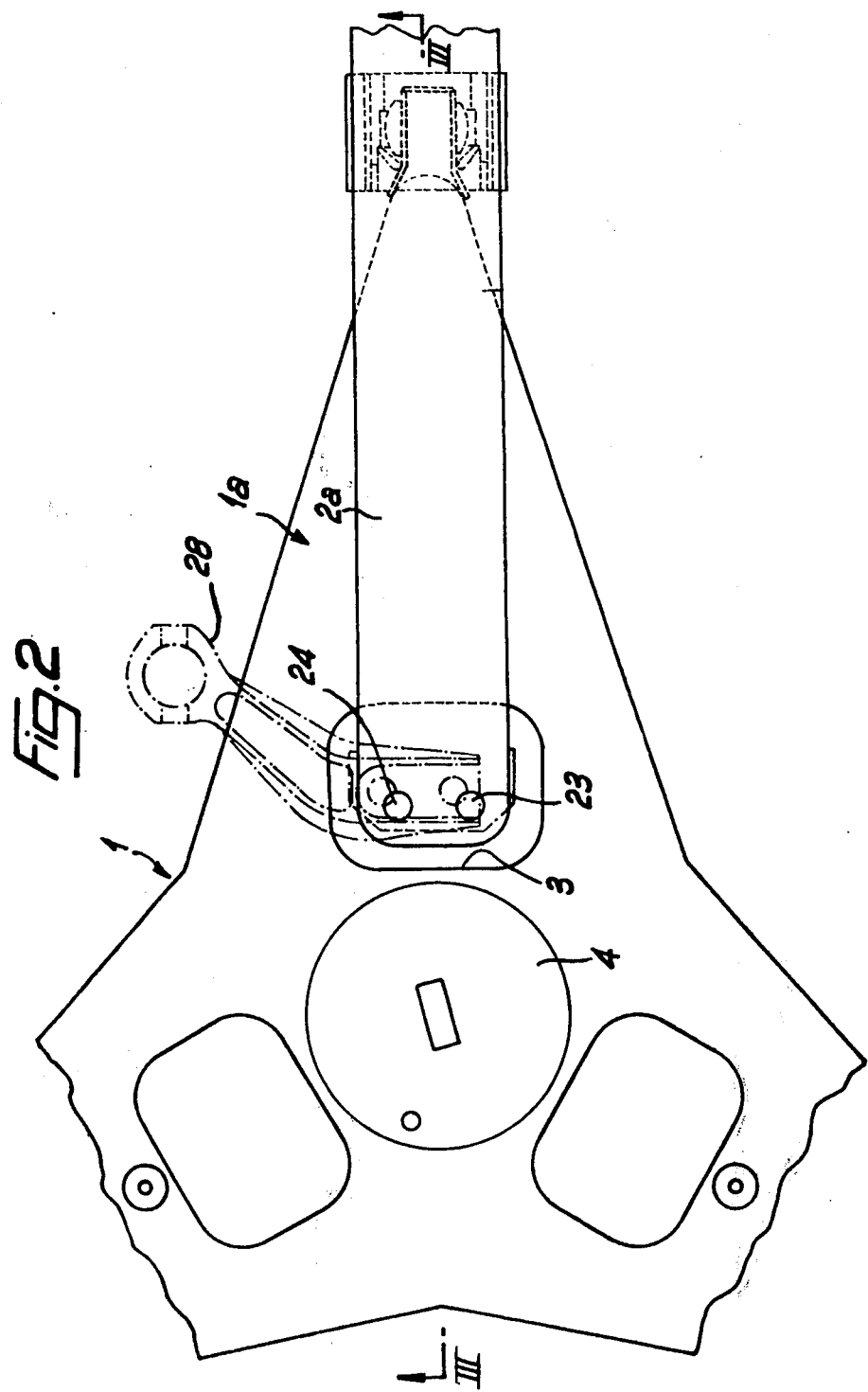

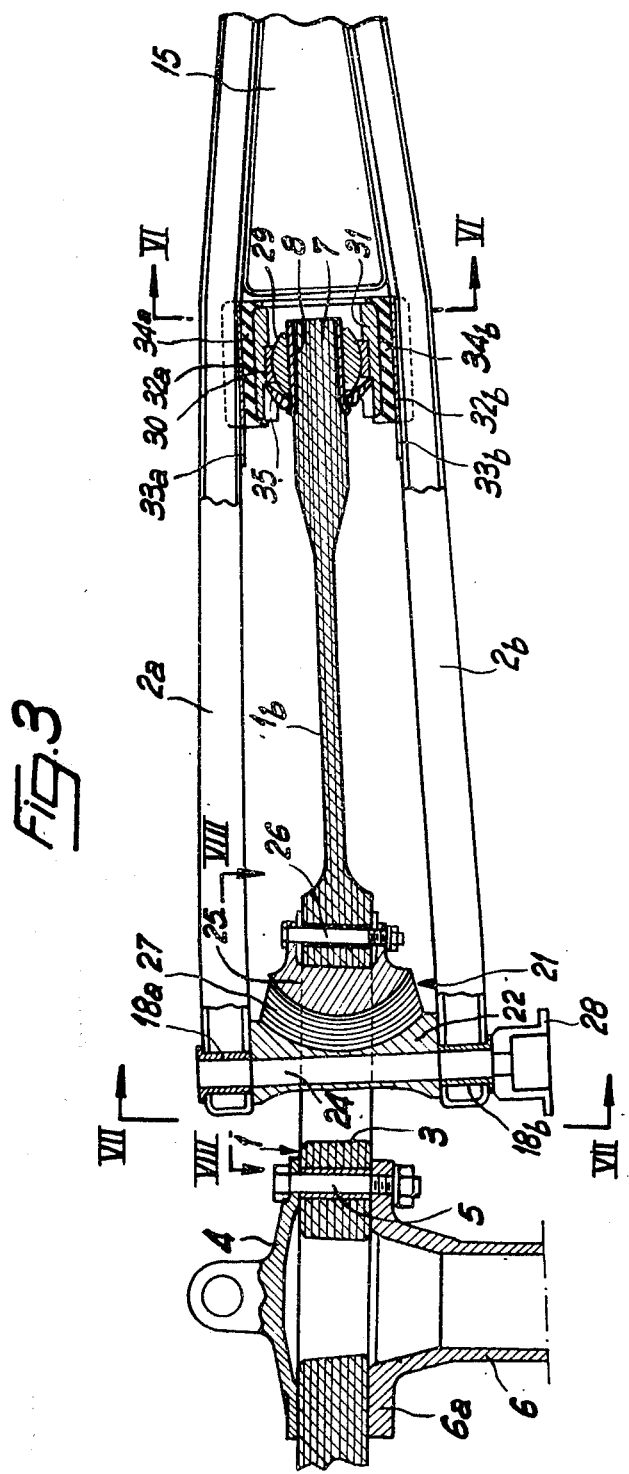

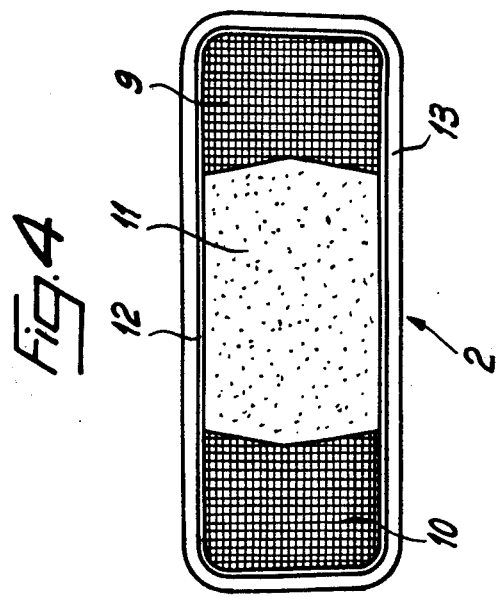
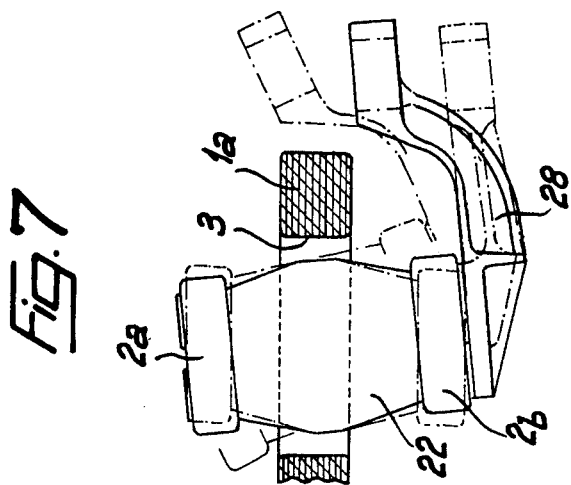

ROTOR FOR ROTATING WING TYPE AIRCRAFT

This application is a continuation-in-part of application No. 469,045 of May 10, 1974, now U.S. Pat. No. 3,967,918 dated July 6, 1976.

This earlier application, hereinafter called the parent application describes and claims a rotor for rotating wing type aircraft, the star-shaped rotor hub comprising for each blade of the rotating wing system a connecting arm flattened in the star plane and flexible perpendicularly thereto. Such rotor is distinguished in that the blade has at its inward end a yoke which extends towards the hub and whose arms are arranged over both sides of the flat of the corresponding arm, the connection between the blade and the arm being embodied, on the one hand, by a resilient deformable member compressed between the ends of the yoke arms and the outside edge of an aperture in the hub at the base of the arm and, on the other hand, sliding and rotating co-operation between the arm end and the base part of the yoke.

In one embodiment of such rotor in the parent patent application, the terminal yoke of each blade is a sleeve formed with two oppositely disposed slots. The sleeve is a metal member which is independent of the blade; the weight and the production cost of the sleeve are fairly high.

In another embodiment of the rotor the connecting yoke between a blade and an arm of the rotor comprises two rigid parallel plates which are arranged rigidly on both sides of the blade root and which hold captive a sliding swivel joint disposed at the end of the flexible arm. Bridging members are preferably provided between the rigid plates, in particular to limit the amplitude of angular movement of the blade in its plane. Also, on the side remote from the hub the rigid plates embody a yoke for securing the blade by means of two pins, one of which is releasable and both of which are equidistant from the hub axis. As in the case of the sleeve, the feature just described is an item which includes a number of metal parts and is therefore relatively heavy and relatively expensive to manufacture.

It is a main object of this application to simplify and reduce the weight of the construction described in the parent patent so that rotors for rotating wing aircraft can be devised to have only a reduced number of metal parts, with a resulting considerable decrease in their weight and first costs.

According to the invention, the yoke interposed between each blade and the corresponding arm of the star-shaped hub is formed by a continuation, as a two-tined fork, of the blade root towards the hub.

Clearly, the advantages hereinbefore mentioned arise because the yoke associated with each blade is, in accordance with the invention, integral with the blade.

This invention is very advantageous when used for a known kind of rotor for rotating wind aircraft having blades each comprising at least one longitudinal bunch of fibre material, inter alia of glass fibres. In such a case, in accordance with this invention, each bunch of each blade is sub-divided, at an appropriate distance from the end of the corresponding hub arm, into at least a top bunch and a bottom bunch diverging towards the hub, preferably symmetrically of the corresponding hub arm, the top bunch and bottom bunch ends being disposed one above another and being interconnected by at least one bridge-like member extending through the aperture in the hub arm base and carrying the deformable resilient member.

This embodiment of the invention contains a very small number of parts and nearly all of them are made of a fibre material, inter alia of glass fibre, a factor which reacts advantageously not only on rotor weight and first costs but also on its mechanical strength and working life, thanks to the excellent mechanical qualities of glass fibre bunches. The total weight saving for the rotor may be as much as 12%.

In a preferred form of the rotor according to the invention, each hub arm is slidingly mounted at its cylindrical end in a bore of a swivel-joint ball received in a spherical bearing which is retained between the two tines of the fork-like continuation of the corresponding blade root. Preferably, two visco-elastic plates are interposed between the box or casing of the spherical bearing and the two tines of the fork-like continuation and can be secured to them e.g. by vulcanization, to provide a known kind of frequency adapter.

Angular movements of the blade are therefore possible only in the plane of the rotor, the visco-elastic plates producing restoring forces which retain the blade in a middle position and damp blade oscillations in the drag direction.

A blade pitch control lever can be coupled with at least one of the two tines of the fork-like continuation of each blade root.

By way of example, an embodiment of the rotor for rotating wing type aircraft according to this invention is described hereinafter and is shown diagrammatically in the accompanying drawings wherein:

FIG. 1 is a partial view in elevation of the embodiment, the view being limited to the rotor hub and to the fork-like continuation of one of the rotor blades, by which continuation such blade is secured to the hub;

FIG. 2 is a plan view showing some of the hub and of the fork-like continuation of one of the blades;

FIG. 3 is a section on the line III — III of FIG. 2;

FIGS. 4, 5 and 6 are sections on the lines IV — IV, V—V and VI—VI respectively of FIG. 1;

FIG. 7 is a view in partial section on the line VII — VII of FIG. 3, and

FIG. 8 is a view in partial section on the line VIII — VIII of FIG. 3.

Figure 5:
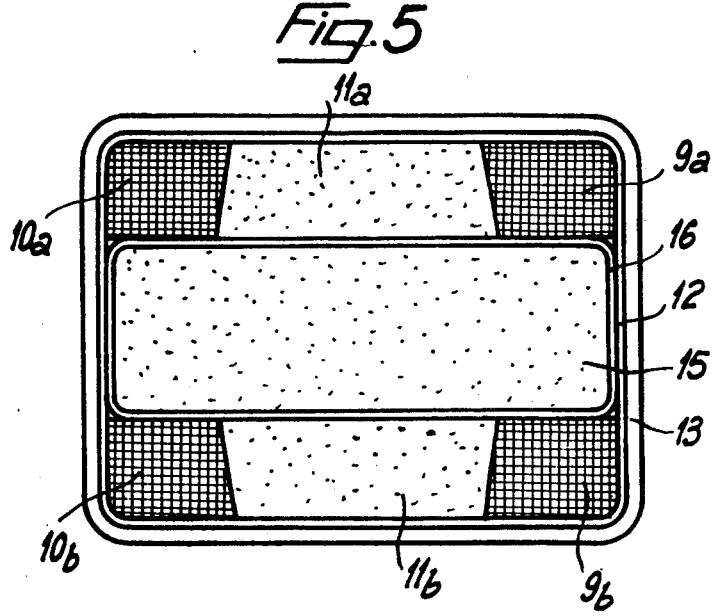

In the embodiment of a rotor for rotating wing type aircraft according to this invention and as diagrammatically illustrated in FIGS. 1 to 3, a star-shaped hub 1 has as many arms, as 1a, as the rotor has blades, as 2. The hub 1 and its arms are devised mainly from a mixture of glass fibres and a thermosetting resin. The three arms as 1a, in shape each resemble an isosceles triangle whose thick bases are associated with the equally thick central part of the hub whereas the central portion 1b (FIG. 3) of each arm, as 1a, is of reduced thickness. The thick base of each hub arm, as 1a, is formed with a rectangular aperture 3 whose purpose will be described hereinafter. The thick central part of the star-shaped hub, and a lug 4 on the top thereof, are secured by bolts 5 to a substantially horizontal collar or ring or the like 6a or a rotor mast 6. The end of each arm, as 1a, serves as a cylindrical bearing surface 7 to which a metal sleeve 8 is secured.

As can be seen in the sectioned view of FIG. 4, each rotor blade, as 2, is embodied in its root zone and in this particular embodiment by two longitudinal bunches of glass fibres forming groups 9, 10 which are of substantially rectangular cross-section, one such group being disposed along the leading edge of the corresponding blade while the other group is disposed along the trailing edge of the corresponding blade. Disposed between the two groups 9 and 10 is a block 11 which is also of substantially rectangular cross-section and which is made of a lightweight material such as a cellular plastics. The system embodied by the three integers 9 – 11 is covered externally by a first covering 12, in the form of a winding of crossed glass fibres, and by a second covering, in the form of a synthetic-resin-impregnated glass fibre fabric sheath 13. The two coverings 12, 13 impart high torsional stiffness to the corresponding zone of the blade 2.

As can be seen in the view in elevation in FIG. 1 and in the sectional view in FIG. 5, at an appropriate distance from end 7 of hub arm 1a, each of the two groups 9, 10 is sub-divided into a top bunch or group 9a, 10a and a bottom bunch or group 9b or 10b which diverge symmetrically of arm 1a towards hub 1. Lightweight members 11a, 11b, more particularly of cellular plastics, are respectively interposed between the top bunches 9a, 10a and the bottom bunches 9b, 10b to continue the blade root towards the hub 1 in the form of a fork having two tines 2a, 2b. The space therebetween is filled, in the part between the line of divergence (14 in FIG. 1) and the hub arm end 7, by a wedge-shaped member 15 which is also made of a lightweight material, e.g. a cellular plastics, and which has a covering 16 of a synthetic-resin-impregnated fabric. The system embodied by the two tines 2a, 2b and the members 15 therebetween is covered by continuations of the two outer coverings 12, 13 of blade 2.

Figure 6:
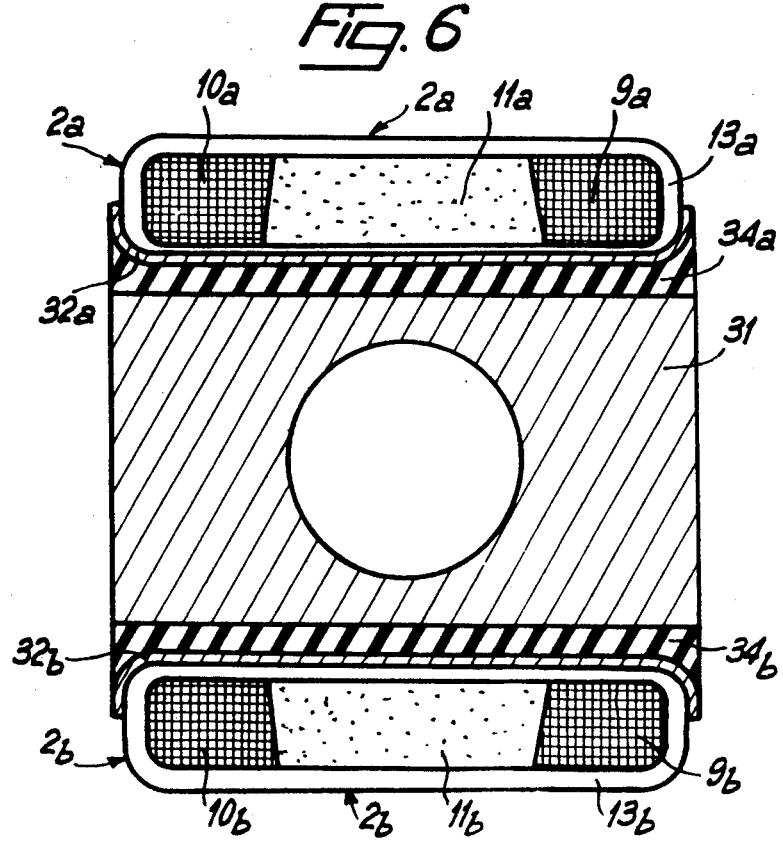

The members 15 and the two outer coverings 12, 13 are interrupted (at a place 17 in FIG. 1) a short distance in front of the hub arm end 7, but the tines 2a 2b extend towards the centre of the hub 1 symmetrically on either side of hub arm 1a to beyond the reduced-section central portion 1b. As can be gathered from the top and bottom parts of the sectioned view given in FIG. 6 each of the two tines 2a, 2b is embodied by two glass fibre bunches 9a, 10a and 9b, 10b respectively which are separated by a cellular plastics member 11a, 11b respectively and covered with a respective synthetic-resin-impregnated fabric covering 13a, 13b respectively. The ends of the two tines 2a, 2b are disposed one above another on either side of the aperture 3 in the hub arm base. As can be gathered from the partial sectioned view in FIG. 8, near the ends of the two tines 2a, 2b, the two glass fibre bunches thereof, e.g. 9a and 10a, are sub-divided into two elements, e.g. $10a_1$, $10a_2$ and $9a_1$, $9a_2$ forming two loops 9c, 10c respectively around respective metal sleeves 17a, 18a. As well as the member 11a, members 19, 20 made of the same material as the member 11a are interposed between the various bunches $9a_1$, $9a_2$, $10a_1$, $10a_2$ to maintain a rectangular cross-section at the end of each of the two tines, as 2a, all the various elements which make up the end of a tine being further covered by the covering 13a. Disposed between the tine ends which are in vertical alignment with one another is a resilient deformable member 21 which can be devised as described and shown in the parent patent and in the first addition thereto, more particularly as shown in FIG. 2 of such first addition. The member 21 has a bridging member 22 which is disposed between the vertically opposite ends of the two tines 2a, 2b so as to extend through the hub arm aperture 3; member 22 is secured to the tine ends by releasable pin 23, 24 whose ends are engaged in metal sleeves 17a, 17b and 18a, 18b. The bridging member surface which is near the blade 2 is dished and is open towards a swivel-ball 25 which is substantially of the same curvature as the dished surface of the bridging member and which a pin 26 secures to the outside edge of aperture 3 in the hub 1a. Alternate spherical strips 27 of metal and elastomer which have been vulcanized together are interposed between the dished surface of the bridging member 22 and the ball 25.

A blade pitch control lever is coupled with the bottom tine 2b by way of a member 28 secured to the bottom ends of the two pins 23, 24. As can be seen in the sectioned view in FIG. 7, the latter lever (not shown) can be used to vary the inclination of the member 28 and thus pivot, by way of the pins 23 and 24, the bridging member 22 and the two tines 2a, 2b, and thus alter blade pitch.

As in the parent patent and in the first addition thereto the cylindrical bearing surface 7 terminating each arm, as 1a, of the star-shaped hub is engaged by way of a metal sleeve 8 in a bore in a swivel ball 29 received in a spherical bearing or bearing socket retained between the two tines 2a and 2b. In the particular embodiment concerned, the spherical bearing comprises a dished member 30 disposed in a box or casing 31 having plane top and bottom surfaces extending substantially parallel to the top and bottom surfaces of the two tines 2a, 2b respectively.

Sheet-metal covers 32a, 32b are applied to such top and bottom surfaces of the tines 2a, 2b are immobilized axially by abutments 33a, 33b embodied e.g. by synthetic-resin-impregnated fabric layers which are struck to the respective surfaces of the tines 2a, 2b. Substantially rectangular visco-elastic plates 34a, 34b are interposed between the top and bottom surfaces of the casing 31 and the covers 32a, 32b. The latter plates are secured, preferably by vulcanization, to the elements between which they are disposed. The spherical bearing is made sealing tight on the side near the centre of the hub by an annular lipped gasket 35.

The system comprising the spherical bearing and the visco-elastic plates 34a, 34b is a frequency adapter of one of the kinds described in French Patent application No. 69 35410, filed by the company styled SUD AVIATION SOCIETE NATIONALE DE CONSTRUCTIONS AERONAUTIQUES on Oct. 16, 1969, for 'Damped resilient connecting means between the blade and the hub of a rotor for rotating wing type aircraft'.

The complete system embodied by the integers 29 – 31, 32a, 32b, 34a and 34b can readily be removed from the space between the relatively flexible tines 2a, 2b by temporarily increasing the height of the space; such height can be increased in the same way to reintroduce the system readily between the tines 2a, 2b until they abut the axial abutments 33a, 33b. This feature considerably eases the problem of periodic inspections of the rotor according to this invention.

The rotor hereinbefore described is not only considerably lighter and cheaper than the known products but is very reliable and has a very long working life. The reliability and long life factors arise inter alia because the two extension tines of each blade which serve to connect the blade to the hub are very strong since they consist mainly of glass fibre bunches. The tines can therefore be so dimensioned as to experience only very reduced stressing, and so they have high fatigue strength. Also, the connection between each blade and the hub is very near the articulation centre for the oscillating movement of the blade. The loads in this zone are reduced to centrifugal force and to shear forces produced by the blade, the articulation virtually obviating static and dynamic flapping and drag torques. The forces applied to the connection are therefore reduced considerably and the connection therefore has a virtually unlimited life.

This invention is not limited to the embodiment hereinbefore described but covers all variants in which some of the means used are replaced by functionally equivalent means. For instance, embodiments of the spherical bearing receiving the end of each arm of the star-shaped hub, and of the frequency adapter associated with such bearing, are optional. In particular, the frequency adapter can be varied in accordance with the disclosure in French Patent Application 69 35410 previously referred to. The number and arrangement of the glass fibre bunches in the two blade extension tines are also optional matters.

This invention is also of use for rotors having various kinds of blade not comprising glass fibre bunches.

We claim:

1. A rotor for a rotating-wing craft comprising a driving shaft, a flat star-shaped rotor hub made of resin-reinforced glass fibres and substantially extending in a plane perpendicular to said driving shaft, said rotor having a central part adapted for being secured to the end of said driving shaft and a plurality of flat arms extending each from said hub central part substantially along a radial axis in said plane, said hub central part and flat arms having, in the direction perpendicular to said plane, respective thickness of substantially different values so that said central part is rigid and said flat arms are flexible in said direction, a same plurality of rotor blades having each a fork-shaped root part, disposed in closed relationship to the outer end of one of said hub arms, and having two arms extending substantially along the radial axis of the respective hub arm at a distance from the two faces of said flat arm respectively, first and second means for connecting the fork-shaped root part of each rotor blade to said hub central part and to the outer end of said hub arm respectively, said first and second connecting means being adapted for permitting resiliently limited rotations and sliding displacement of said blade root part around and along said radial axis in relation to said hub central part and arm, and said first connecting means being further adapted for transmitting centrifugal radial forces from said rotor blade directly to said rigid hub central part, whereby flapping movements of the rotor blades in said direction are permitted by the flexible hub flat arms and said connecting means.

2. A rotor according to claim 1, wherein a same plurality of apertures having each an inside edge and an outside edge is arranged in said hub central part substantially on the respective radial axes of said hub arms, the two arms of said forked-shaped root part of each rotor blade extending along the radial axis of the respective hub arm to the central part aperture on said radial axis, and said first connecting means comprises a spherical abutement having an elastically deformable member inserted between the outside edge of said aperture and the inner ends of the arms of the respective root part.

3. A rotor according to claim 2, wherein each blade comprises at least one longitudinal bunch of fibres material, said bunch being sub-divided, from a predetermined cross-section of the blade towards the end of the respective hub arm, into at least a top bunch and a bottom bunch diverging towards the hub, said top bunch and bottom bunch being disposed one above the other symmetrically of the respective hub arm, and at least one bridge-like member is disposed to extend through the respective aperture the hub central part and to interconnect the respective ends of said top bunch and bottom bunch, the respective deformable resilient member being attached to said bridge-like member.

4. A rotor according to claim 3, wherein the gap between the divergent top and bottom bunches is filled, in the part between said predetermined cross-section of the blade and the end of the respective hub arms, by a lightweight wedge-shaped block made of a low density material, said block being covered by a synthetic-resin-impregnated fabric covering.

5. A rotor according to claim 3, wherein each blade comprises two longitudinal bunches made of fibre material and disposed the one along the leading edge and the other along the trailing edge of the blade, said two longitudinal bunches being separated by a lightweight block of a low density material, each blade being wholly covered by at least one covering consisting of a synthetic-resin-impregnated glass fibre material, and wherein the top and bottom bunches into which each of said two longitudinal bunches of each blade is sub-divided towards the end of the respective hub arm, are further sub-divided to form two loops respectively disposed above and under the respective aperture in said hub central part, two sleeves being placed in said two loops respectively, a releasable pin extending through said two sleeves and through said bridge-like member, and lightweight blocks of a low-density material being further interposed between said sub-divided fibre bunches.

6. A rotor according to claim 1, wherein a frequency-adapter unit is mounted between the cylindrical end of each hub arm and the base of the fork-shaped root part of the respective blade, said frequency-adapter unit comprising a bow, in this box a spherical bearing with a swivel-joint ball slidably mounted on the cylindrical end of the respective hub arm, sheet-metal covers placed on the facing surfaces of the arms of said fork-shaped root part, at least one abutment disposed on each of said arms and formed by synthetic-resin-impregnated fabric layers for locking the respective sheet-metal cover along said radial axis, and visco-elastic plates which are respectively disposed between said box and said sheet-metal covers, and which are secured thereto by vulcanization.

7. A rotor according to claim 1, wherein a blade pitch control lever is coupled with at least one of the two arms of the fork-shaped root part of each blade.

* * * * *